US009018311B2

(12) United States Patent
Niitani et al.

(10) Patent No.: US 9,018,311 B2
(45) Date of Patent: Apr. 28, 2015

(54) COPOLYMER

(75) Inventors: Takeshi Niitani, Ichihara (JP); Toshiaki Okado, Ichihara (JP); Hidenori Naruse, Tokyo (JP); Tooru Kajita, Tokyo (JP)

(73) Assignee: Nippon Soda Co., Ltd., Tokyo (JP)

( * ) Notice: Subject to any disclaimer, the term of this patent is extended or adjusted under 35 U.S.C. 154(b) by 0 days.

(21) Appl. No.: 13/879,159

(22) PCT Filed: Nov. 2, 2011

(86) PCT No.: PCT/JP2011/006133
§ 371 (c)(1),
(2), (4) Date: Apr. 12, 2013

(87) PCT Pub. No.: WO2012/063435
PCT Pub. Date: May 18, 2012

(65) Prior Publication Data
US 2013/0217832 A1 Aug. 22, 2013

(30) Foreign Application Priority Data

Nov. 8, 2010 (JP) .................................. 2010-249493

(51) Int. Cl.
| C09D 11/326 | (2014.01) |
| C08F 265/04 | (2006.01) |
| C08F 297/02 | (2006.01) |

(52) U.S. Cl.
CPC ........... *C08F 265/04* (2013.01); *C08F 297/026* (2013.01); *C09D 11/326* (2013.01)

(58) Field of Classification Search
CPC .. C09D 11/326; C08F 265/04; C08F 297/026
USPC .......................................... 525/284, 294, 299
See application file for complete search history.

(56) References Cited

U.S. PATENT DOCUMENTS

| 5,085,698 A * | 2/1992 | Ma et al. .................. 524/388 |
| 5,519,085 A * | 5/1996 | Ma et al. .................. 524/503 |
| 5,912,280 A * | 6/1999 | Anton et al. .................. 523/161 |
| 6,197,883 B1 * | 3/2001 | Schimmel et al. ............ 525/111 |
| 2003/0175502 A1 | 9/2003 | Obayashi et al. |
| 2007/0185272 A1 | 8/2007 | Gobelt |
| 2010/0168316 A1 | 7/2010 | Gobelt et al. |

FOREIGN PATENT DOCUMENTS

| DE | 10 2006 048 144 A1 | 4/2008 |
| EP | 0 556 650 A1 | 8/1993 |
| JP | A-3-247672 | 11/1991 |
| JP | H06-136311 A | 5/1994 |
| JP | H11-269418 A | 10/1999 |
| JP | A-2000-169531 | 6/2000 |
| JP | A-2003-227901 | 8/2003 |
| JP | A-2004-182787 | 7/2004 |
| JP | A-2004-287366 | 10/2004 |
| JP | A-2007-217664 | 8/2007 |
| JP | A-2010-134419 | 6/2010 |
| KR | 2002-0010693 | 2/2002 |
| WO | WO 00/75791 A2 | 12/2000 |
| WO | 2010/020317 A1 | 2/2010 |

OTHER PUBLICATIONS

Jan. 24, 2012 International Search Report issued in International Application No. PCT/JP2011/006133.
International Preliminary Report on Patentability issued in International Patent Application No. PCT/JP2011/006133 dated May 14, 2013.
May 2, 2014 Supplementary European Search Report issued in European Application No. 11840444.1.

\* cited by examiner

*Primary Examiner* — Mark Kaucher
(74) *Attorney, Agent, or Firm* — Oliff PLC

(57) ABSTRACT

An object of the present invention is to provide a novel copolymer useful as a pigment dispersing agent in the field of color liquid crystal displays and the like. A copolymer of the present invention contains a block chain (A) comprising at least one repeating unit selected from the group consisting of a repeating unit having a tertiary amino group and a repeating unit having a quaternary ammonium base; and a block chain (B) comprising a repeating unit represented by formula (I) (wherein $R^1$ represents a hydrogen atom or the like, $R^2$ and $R^3$ each independently represent a hydrogen atom or the like, Q represents an oxygen-containing saturated heterocyclic group optionally having an alkyl group as a substituent or the like, and n represents an integer of 0 to 6), and a repeating unit represented by formula (II) (wherein $R^4$ represents a hydrogen atom or the like and $R^5$ represents a saturated aliphatic hydrocarbon group or the like), and a copolymerization ratio of the repeating unit represented by formula (II) is 90 wt % or more in the block chain (B) excluding the repeating unit represented by formula (I).

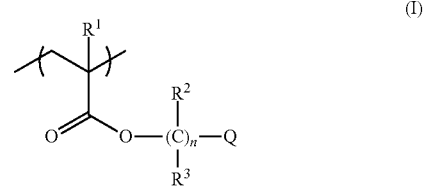

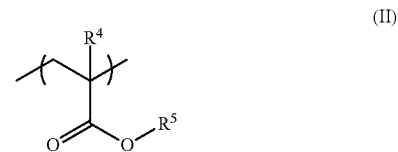

5 Claims, No Drawings

COPOLYMER

TECHNICAL FIELD

The present invention relates to a novel copolymer useful as a dispersing agent. The present application claims the benefit of priority from Japanese Patent Application No. 2010-249493, filed on Nov. 8, 2010, the contents of which are incorporated herein by reference.

BACKGROUND ART

Copolymer-type pigment dispersing agents have been developed in a variety of fields.

In the field of, for example, color liquid crystal displays, a copolymer-type pigment dispersing agent is used as a dispersing agent for a pigment to be contained in a radiosensitive composition used for forming a color layer. In this field, because of increasing demands for higher visible light transmittance and higher contrast, pigment particles are made further finer at least to a wavelength of visible light or smaller.

As a dispersing agent for stably dispersing such a pigment in the form of finer particles, various copolymers have been proposed. For example, Patent Document 1 and Patent Document 2 propose, for improving dispersion stability of a pigment, use of a dispersing agent composed of a block having a quaternary ammonium base and a block having no quaternary ammonium base.

Furthermore, Patent Document 3 proposes a radiosensitive composition used for forming a color layer, containing, as a dispersing agent, a copolymer having a repeating unit represented by formula (1), a repeating unit represented by formula (2) and a repeating unit represented by formula (3).

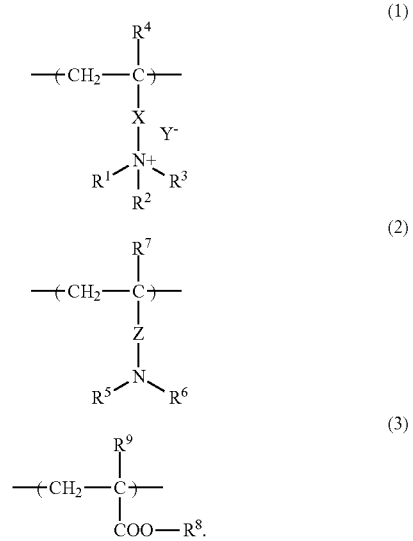

PRIOR ART DOCUMENTS

Patent Documents

Patent Document 1: Japanese unexamined Patent Application Publication No. 2004-182787
Patent Document 2: Japanese unexamined Patent Application Publication No. 2004-287366
Patent Document 3: Japanese unexamined Patent Application Publication No. 2010-134419

SUMMARY OF THE INVENTION

Object to be Solved by the Invention

In recent years, in accordance with diversification of use of dispersing agents, a copolymer to be used as a dispersing agent has been required to have various characteristics. If a copolymer is used as a pigment dispersing agent in the field of color liquid crystal displays, the dispersing agent is required to satisfy dispersibility for a pigment in the form of finer particles attained at an initial stage and dispersion stability attained over time. Furthermore, it is also required to meet various requirements such as improvement in contrast, luminance and developing property of a liquid crystal display device comprising a color filter. Conventional copolymers, however, have a problem in which sufficient performances are not attained.

Means to Solve the Object

The present inventors have earnestly studied for overcoming the aforementioned problems, resulting in finding that the problems can be overcome by using a novel copolymer comprising a block chain consisting of a polymer containing at least one repeating unit selected from the group consisting of a repeating unit having a tertiary amino group and a repeating unit having a quaternary ammonium base; and a block chain containing a repeating unit represented by formula (I) and a repeating unit represented by formula (II), and thus, the present invention has been achieved.

Specifically, the present invention relates to:

(1) a copolymer comprising a block chain (A) comprising at least one repeating unit selected from the group consisting of a repeating unit having a tertiary amino group and a repeating unit having a quaternary ammonium base, and a block chain (B) comprising a repeating unit represented by formula (I):

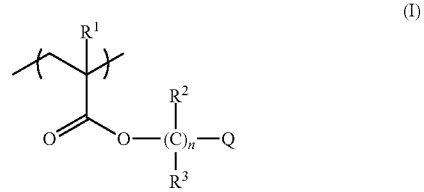

(wherein $R^1$ represents a hydrogen atom or a C1-C3 alkyl group, $R^2$ and $R^3$ each independently represent a hydrogen atom or a C1-C6 alkyl group, Q represents an oxygen-containing saturated heterocyclic group optionally having an alkyl group as a substituent or a C2-C20 alkenyl group, and n represents an integer of 0 to 6) and a repeating unit represented by formula (II):

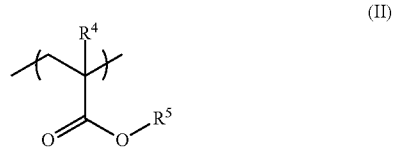

(wherein $R^4$ represents a hydrogen atom or a C1-C3 alkyl group and $R^5$ represents a saturated aliphatic hydrocarbon group or a saturated alicyclic hydrocarbon group), wherein a copolymerization ratio of the repeating unit represented by formula (II) is 90 wt % or more in the block chain (B) excluding the repeating unit represented by formula (I);
(2) the copolymer according to (1), wherein the at least one repeating unit selected from the group consisting of a repeating unit having a tertiary amino group and a repeating unit having a quaternary ammonium base is a repeating unit represented by formula (III):

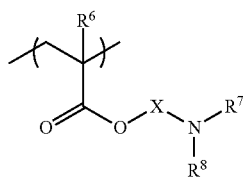

(III)

(wherein $R^6$ represents a hydrogen atom or a C1-C3 alkyl group, $R^7$ and $R^8$ each independently represent a C1-C6 alkyl group or a C6-C10 aryl C1-C6 alkyl group, and X represents a C1-C10 alkylene group or a C1-C10 alkylene-O—C1-C10 alkylene group.);

(3) the copolymer according to (1) or (2), wherein the copolymer has ratio (Mw/Mn) of a weight average molecular weight (Mw) to a number average molecular weight (Mn) of 1.01 to 2.00; and (4) the copolymer according to any one of (1) to (3), wherein the copolymer has a weight average molecular weight (Mw) of 2000 to 50000.

MODE OF CARRYING OUT THE INVENTION (1) Copolymer

A copolymer of the present invention contains at least one block chain (A) and at least one block chain (B) described below.

Block chain (A): a block chain comprising at least one repeating unit selected from the group consisting of a repeating unit having a tertiary amino group and a repeating unit having a quaternary ammonium base.

Block chain (B); a block chain comprising a repeating unit represented by formula (I) and a repeating unit represented by formula (II).

Furthermore, the copolymer of the present invention may contain another block chain in addition to the block chain (A) and the block chain (B).

1) Block Chain (A)

In the block chain (A), the repeating unit having a tertiary amino group and the repeating unit having a quaternary ammonium base are not particularly limited as far as they have such a cationic functional group on a side chain thereof.

Specifically, the block chain (A) includes a homopolymer consisting of merely one repeating unit having a tertiary amino group or a repeating unit having a quaternary ammonium base, a copolymer consisting of two or more repeating units having a tertiary amino group or repeating units having a quaternary ammonium base, a copolymer consisting of at least one repeating unit having a tertiary amino group and at least one repeating unit having a quaternary ammonium base, and a copolymer of any of these polymers and another repeating unit derived from a copolymerizable monomer. The copolymer includes a random copolymer, an alternating copolymer, a block copolymer, and the like.

(Repeating Unit Having Tertiary Amino Group)

The repeating unit having a tertiary amino group is not particularly limited as far as it has a tertiary amino group, and an example is a repeating unit represented by the following general formula (IV):

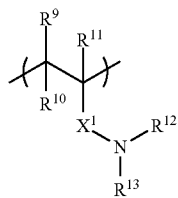

(IV)

In formula (IV), $R^9$, $R^{10}$ and $R^{11}$ each independently is a hydrogen atom or a C1-C3 alkyl group. $X^1$ is a group selected from the group consisting of a C1-C10 alkylene group, —COOR$^{14}$—, —CONHR$^{14}$—, —OCOR$^{14}$— and —R$^{15}$—OCO—R$^{14}$— (wherein $R^{14}$ and $R^{15}$ each independently is a C1-C10 alkylene group or a C1-C10 alkylene-O—C1-C10 alkylene group). $R^{12}$ and $R^{13}$ each independently is a C1-C6 alkyl group or a C6-C10 aryl C1-C6 alkyl group.

Among these, a repeating unit represented by the following formula (III) is preferred:

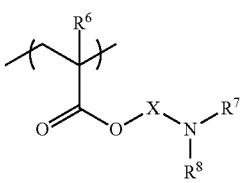

(III)

In formula (III), $R^6$ represents a hydrogen atom or a C1-C3 alkyl group, $R^7$ and $R^8$ each independently represent a C1-C6 alkyl group or a C6-C10 aryl C1-C6 alkyl group, and X represents a C1-C10 alkylene group or a C1-C10 alkylene-O—C1-C10 alkylene group.

Here, examples of the C1-C3 alkyl group or the C1-C6 alkyl group include methyl, ethyl, n-propyl, i-propyl, n-butyl, s-butyl, i-butyl, t-butyl, n-pentyl and n-hexyl.

Examples of the C1-C10 alkylene group include a methylene chain, an ethylene chain, a propylene chain, a methyl ethylene chain, a butylene chain, a 1,2-dimethylethylene chain, a pentylene chain, a 1-methylbutylene chain, a 2-methylbutylene chain or a hexylene chain.

Examples of the C6-C10 aryl C1-C6 alkyl group include benzyl, phenethyl, 3-phenyl-n-propyl, 1-phenyl-n-hexyl, naphthalen-1-ylmethyl, naphthalen-2-ylethyl, 1-naphthalen-2-yl-n-propyl and inden-1-ylmethyl.

Examples of a monomer usable as a material for the repeating unit represented by formula (IV) or formula (III) include dimethylaminoethyl (meth)acrylate, dimethylaminopropyl (meth)acrylate, dimethylaminobutyl (meth)acrylate, diethylaminoethyl (meth)acrylate, diethylaminopropyl (meth)acrylate, and diethylaminobutyl (meth)acrylate.

(Repeating Unit Having Quaternary Ammonium Base)

The repeating unit having a quaternary ammonium base is not particularly limited as far as it has a quaternary ammonium base, and an example is a repeating unit represented by the following general formula (V):

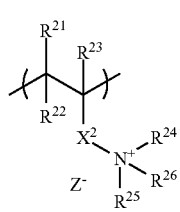

(V)

In formula (V), $R^{21}$, $R^{22}$ and $R^{23}$ each independently is a hydrogen atom or a C1-C3 alkyl group. $X^2$ is a group selected from the group consisting of a C1-C10 alkylene group, —COOR$^{27}$—, —CONHR$^{27}$—, —OCOR$^{27}$— and —R$^{28}$—OCO—R$^{27}$— (wherein $R^{27}$ and $R^{28}$ each independently is a C1-C10 alkylene group or a C1-C10 alkylene-O—C1-C10 alkylene group). $R^{24}$, $R^{25}$ and $R^{26}$ each independently is a C1-C6 alkyl group or a C6-C10 aryl C1-C6 alkyl group. $Z^-$ represents a counter ion such as a halide ion, an alkyl halide ion, an alkyl carboxylate ion, a nitroxide ion, an alkyl sulfate ion, a sulfonate ion, a phosphate ion or an alkyl phosphate ion.

Here, examples of the C1-C3 alkyl group, the C1-C6 alkyl group, the C1-C10 alkylene group and the C6-C10 aryl C1-C6 alkyl group are the same as those described above with respect to formula (IV) representing the repeating unit having a tertiary amino group.

Among these, a repeating unit represented by formula (VI) is preferred.

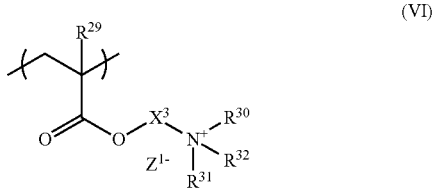

(VI)

In formula (VI), $R^{29}$ is a hydrogen atom or a C1-C3 alkyl group. $X^3$ represents a C1-C10 alkylene group or a C1-C10 alkylene-O—C1-C10 alkylene group. $R^{30}$, $R^{31}$ and $R^{32}$ each independently is a C1-C6 alkyl group or a C6-C10 aryl C1-C6 alkyl group. $Z^{1-}$ a counter ion.

Here, examples of the C1-C3 alkyl group, the C1-C6 alkyl group, the C1-C10 alkylene group and the C6-C10 aryl C1-C6 alkyl group are the same as those described above with respect to formula (III) representing the repeating unit having a tertiary amino group.

Examples of $Z^{1-}$ are the same as those described above with respect to $Z^-$ of formula (V).

Examples of a monomer usable as a material for the repeating unit represented by formula (V) or formula (VI) include (meth)acryloyloxyethyltrimethyl ammonium fluoride, (meth)acryloyloxyethyltrimethyl ammonium chloride, (meth)acryloyloxyethyltrimethyl ammonium bromide, (meth)acryloyloxyethyltrimethyl ammonium iodide, (meth)acryloyloxypropyltrimethyl ammonium fluoride, (meth)acryloyloxypropyltrimethyl ammonium chloride, (meth)acryloyloxypropyltrimethyl ammonium bromide, (meth)acryloyloxypropyltrimethyl ammonium iodide, (meth)acryloyloxybutyltrimethyl ammonium fluoride, (meth)acryloyloxybutyltrimethyl ammonium chloride, (meth)acryloyloxybutyltrimethyl ammonium bromide, and (meth)acryloyloxybutyltrimethyl ammonium iodide.

(Another Repeating Units that can be Contained)

Examples of another repeating unit that can be contained in the block chain (A) include repeating units derived from a (meth)acrylic acid-based monomer, an aromatic vinyl-based monomer, a conjugated diene-based monomer or the like.

Examples of the (meth)acrylic acid-based monomer, the aromatic vinyl-based monomer or the conjugated diene-based monomer usable as a material for the repeating unit are as follows.

Examples of the (meth)acrylic acid-based monomer include (meth)acrylic acid; (meth)acrylic acid ester compounds such as methyl (meth)acrylate, ethyl (meth)acrylate, n-propyl (meth)acrylate, i-propyl (meth)acrylate, n-butyl (meth)acrylate, i-butyl (meth)acrylate, s-butyl (meth)acrylate, t-butyl (meth)acrylate, hexyl (meth)acrylate, glycidyl (meth)acrylate, cyclohexyl (meth)acrylate, 2-ethylhexyl (meth)acrylate, 1-ethylcyclohexyl (meth)acrylate and benzyl (meth)acrylate; 2-methoxyethyl (meth)acrylate, methoxypolyethylene glycol (in which the number of ethylene glycol units is 2 to 100) (meth)acrylate, ethoxypolyethylene glycol (meth)acrylate, and phenoxypolyethylene glycol (meth)acrylate, and these monomers may be singly used or a mixture of two or more of them may be used.

Examples of the aromatic vinyl-based monomer include styrene; styrene derivatives such as o-methylstyrene, p-methylstyrene, p-t-butylstyrene, α-methylstyrene, p-t-butoxystyrene, m-t-butoxystyrene, p-(1-ethoxyethoxy)styrene, 2,4-dimethylstyrene, vinylaniline and vinylbenzoic acid; heteroaryl compounds such as 2-vinylpyridine, 4-vinylpyridine, 2-vinylquinoline, 4-vinylquinoline, 2-vinylthiophene, and 4-vinylthiophene; vinylnaphthalene, vinylanthracene; and these monomers may be singly used or a mixture of two or more of them may be used.

Examples of the conjugated diene-based monomer include 1,3-butadiene, isoprene, 2-ethyl-1,3-butadiene, 2-t-butyl-1,3-butadiene, 2-phenyl-1,3-butadiene, 2,3-dimethyl-1,3-butadiene, 1,3-pentadiene, 2-methyl-1,3-pentadiene, 3-methyl-1,3-pentadiene, 1,3-hexadiene, 2-methyl-1,3-octadiene, 4,5-diethyl-1,3-octadiene, 3-butyl-1,3-octadiene, 1,3-cyclopentadiene, 1,3-cyclohexadiene, 1,3-cyclooctadiene, 1,3-tricyclodecadiene, myrcene, and chloroprene, and these monomers may be singly used or a mixture of two or more of them may be used.

2) Block Chain (B)

The block chain (B) contains at least one repeating unit represented by formula (I) and at least one repeating unit represented by formula (II).

A ratio in weight percent between the at least one repeating unit represented by formula (I) and the at least one repeating unit represented by formula (II) (i.e., a ratio between the weight percent of the repeating unit represented by formula (I) and the weight percent of the repeating unit represented by formula (II), assuming that a total weight of the repeating unit represented by formula (I) and the repeating unit represented by formula (II) is 100) is not particularly limited, but is preferably 5 to 50:95 to 50, more preferably 7 to 45:93 to 55, further more preferably 10 to 40:90 to 60 and particularly preferably 15 to 35:85 to 65.

A copolymerization ratio of the at least one repeating unit represented by formula (II) in the block chain (B) excluding the repeating unit represented by formula (I) is 90 wt % or more and preferably 95 wt % to 100 wt %.

Furthermore, the block chain (B) includes a random copolymer, an alternating copolymer, a block copolymer and the like.

(Repeating Unit Represented by Formula (I))

The block chain (B) contains at least one repeating unit represented by formula (I):

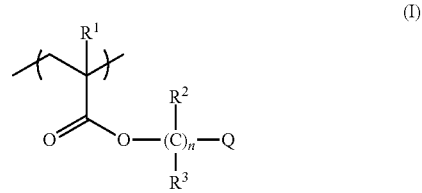

(I)

In formula (I), $R^1$ represents a hydrogen atom or a C1-C3 alkyl group, $R^2$ and $R^3$ each independently represent a hydrogen atom or a C1-C6 alkyl group, Q represents an oxygen-containing saturated heterocyclic group optionally having a substituent or a C2-C20 alkenyl group, and n represents an integer of 0 to 6.

In the present invention, examples of the C1-C3 alkyl group of $R^1$ and the C1-C6 alkyl group are the same as those described above with respect to formula (III) representing the repeating unit having a tertiary amino group.

In the present invention, the oxygen-containing saturated heterocyclic group of Q optionally have a substituent at an arbitrary carbon atom of the ring. An oxygen-containing saturated heterocyclic group means a 3- to 8-membered saturated hetero ring comprising at least one oxygen atom and further optionally comprising one hetero atom of N, S and O, and is preferably a 3- to 6-membered saturated hetero ring.

Here, examples of the oxygen-containing saturated heterocyclic group include an oxiranyl group, an oxetanyl group, a tetrahydrofuranyl group, a tetrahydropyranyl group, a morpholinyl group and a thiomorpholinyl group. Among these, cross-linkable functional groups such as an oxiranyl group, an oxetanyl group, a tetrahydrofuranyl group and a tetrahydropyranyl group are preferred.

The substituent of the oxygen-containing saturated heterocyclic group is a C1-C6 alkyl group. Examples of the C1-C6 alkyl group are the same as those described above with respect to formula (III) representing the repeating unit having a tertiary amino group.

Examples of the C2-C20 alkenyl group of Q include a vinyl group, a 1-propenyl group, a 2-propenyl group, a 1-butenyl group, a 2-butenyl group, a 3-butenyl group, a 1-methyl-2-propenyl group, a 2-methyl-2-propenyl group, a 1-pentenyl group, a 2-pentenyl group, a 3-pentenyl group, a 4-pentenyl group, a 1-methyl-2-butenyl group, a 2-methyl-2-butenyl group, a 1-hexenyl group, a 2-hexenyl group, a 3-hexenyl group, a 4-hexenyl group, a 5-hexenyl group, a heptenyl group, an octenyl group, a decenyl group, a pentadecenyl group, an eicosenyl group and a tricosenyl group. Among these, C2-C6 alkenyl groups are preferred.

Examples of a monomer usable as a material for the repeating unit represented by formula (I) include oxetan-2-ylmethyl (meth)acrylate, oxetan-3-ylmethyl (meth)acrylate, (2-methyloxetan-2-yl)methyl (meth)acrylate, (3-methyloxetan-3-yl) methyl (meth)acrylate, (2-ethyloxetan-2-yl)methyl (meth) acrylate, (3-ethyloxetan-3-yl)methyl (meth)acrylate, (3-propyloxetan-3-yl)methyl (meth)acrylate, 2-(oxetan-2-yl) ethyl (meth)acrylate, 2-(oxetan-3-yl)ethyl (meth)acrylate, (tetrahydrofuran-2-yl)methyl (meth)acrylate, (tetrahydrofuran-3-yl)methyl (meth)acrylate, (2-methyltetrahydrofuran-2-yl)methyl (meth)acrylate, (3-methyltetrahydrofuran-3-yl) methyl (meth)acrylate, (5-methyltetrahydrofuran-2-yl) methyl (meth)acrylate, (4-methyltetrahydrofuran-2-yl) methyl (meth)acrylate, (3-methyltetrahydrofuran-2-yl) methyl (meth)acrylate, (2-methyltetrahydrofuran-3-yl) methyl (meth)acrylate, (5-methyltetrahydrofuran-3-yl) methyl (meth)acrylate, (4-methyltetrahydrofuran-3-yl) methyl (meth)acrylate, 2-(tetrahydrofuran-3-yl)ethyl (meth) acrylate, oxiran-2-ylmethyl (meth)acrylate, (3-methyloxiran-2-yl)methyl (meth)acrylate, (2-methyloxiran-2-yl)methyl (meth)acrylate, allyl (meth)acrylate, 2-methylallyl (meth)acrylate, (meth)acrylic acid, (E)-buten-2-yl (meth)acrylate, (Z)-buten-2-yl (meth)acrylate, 3-butenyl (meth)acrylate, 3-methyl-3-butenyl (meth)acrylate, (E)-penten-3-yl (meth)acrylate, (Z)-penten-3-yl (meth)acrylate and 3-methyl-2-butenyl (meth)acrylate.

(Repeating Unit Represented by Formula (II))

The block chain (B) further contains at least one repeating unit represented by formula (II):

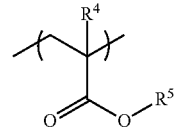

In formula (II), $R^4$ represents a hydrogen atom or a C1-C3 alkyl group and $R^5$ represents a saturated aliphatic hydrocarbon group or a saturated alicyclic hydrocarbon group.

In the present invention, examples of the C1-C3 alkyl group of $R^4$ are the same as those described above with respect to formula (III) representing the repeating unit having a tertiary amino group.

In the present invention, the saturated aliphatic hydrocarbon group of $R^5$ is preferably a C1-C20 alkyl group.

Examples of the C1-C20 alkyl group include a methyl group, an ethyl group, a n-propyl group, an isopropyl group, a n-butyl group, an isobutyl group, a tert-butyl group, a n-pentyl group, an isopentyl group, a neopentyl group, a tert-pentyl group, a 2-methylbutyl group, a n-hexyl group, an isohexyl group, a 3-methylpentyl group, an ethylbutyl group, a n-heptyl group, a 2-methylhexyl group, a n-octyl group, an iso-octyl group, a tert-octyl group, a 2-ethylhexyl group, a 3-methylheptyl group, a n-nonyl group, an isononyl group, a 1-methyloctyl group, an ethylheptyl group, a n-decyl group, a 1-methylnonyl group, a n-undecyl group, a 1,1-dimethylnonyl group, a n-dodecyl group, a n-tetradecyl group, a n-heptadecyl group and a n-octadecyl group. Among these, C1-C6 alkyl groups are particularly preferred.

Furthermore, in the present invention, the saturated alicyclic hydrocarbon group means a saturated hydrocarbon group having a monocyclic or polycyclic structure at any portion within the group, and includes a C3-C20 cycloalkyl group, a C4-C20 alkyl-substituted cycloalkyl group, a C4-C20 cycloalkyl alkyl group and a C7-C20 saturated bridged cyclic hydrocarbon group.

Examples of the C3-C20 cycloalkyl group include cyclopropyl, cyclo-butyl, cyclo-pentyl, cyclo-hexyl, cyclo-heptyl, cyclo-octyl, cyclo-decyl, cyclo-tetradecyl and cyclo-octadecyl.

Examples of the C4-C20 alkyl-substituted cycloalkyl group include 1-methylcyclopropyl, 2-ethylcyclopropyl, 3-methylcyclohexyl, 4-methylcyclohexyl, 4-ethylcyclohexyl, 3-ethylcyclohexyl, 2-methylcyclooctyl, 2-methylcyclodecyl, 3-methylcyclotetradecyl and 3-methylcyclooctadecyl.

Examples of the C4-C20 cycloalkyl alkyl group include cyclopropylmethyl, cyclobutylmethyl, cyclopentylmethyl, cyclohexylmethyl, cycloheptylethyl, cyclooctylethyl, cyclodecylmethyl, cyclotetradecylmethyl and cyclooctadecylmethyl.

Examples of the C7-C20 saturated bridged cyclic hydrocarbon group include a tricyclo[$5.2.1.0^{2,6}$]decan-8-yl group, an adamantyl group, a dicyclopentenyl group and an isobornyl group.

(Another Repeating Unit that can be Contained)

Examples of another repeating unit that can be contained in the block chain (B) include repeating units derived from an aromatic vinyl-based monomer, a conjugated diene-based monomer and the like.

Examples of the aromatic vinyl-based monomer include styrene; styrene derivatives such as o-methyl styrene, p-methyl styrene, p-t-butyl styrene, α-methyl styrene, p-t-butoxystyrene, m-t-butoxystyrene, p-(1-ethoxyethoxy)styrene, 2,4-dimethylstyrene, vinylaniline and vinylbenzoic acid; heteroaryl compounds such as 2-vinylpyridine, 4-vinylpyridine, 2-vinylquinoline, 4-vinylquinoline, 2-vinylthiophene, and 4-vinylthiophene; vinylnaphthalene, vinylanthracene; and these monomers may be singly used or a mixture of two or more of them may be used.

Examples of the conjugated diene-based monomer include 1,3-butadiene, isoprene, 2-ethyl-1,3-butadiene, 2-t-butyl-1,3-butadiene, 2-phenyl-1,3-butadiene, 2,3-dimethyl-1,3-butadiene, 1,3-pentadiene, 2-methyl-1,3-pentadiene, 3-methyl-1,3-pentadiene, 1,3-hexadiene, 2-methyl-1,3-octadiene, 4,5-diethyl-1,3-octadiene, 3-butyl-1,3-octadiene, 1,3-cyclopentadiene, 1,3-cyclohexadiene, 1,3-cyclooctadiene, 1,3-tricyclodecadiene, myrcene, and chloroprene, and these monomers may be singly used or a mixture of two or more of them may be used.

3) Other Items (Block Chain that May be Contained in Copolymer in Addition to Block Chains (A) and (B))

The copolymer of the present invention may contain another block chain in addition to the block chains (A) and (B).

Examples of the another block chain include a block chain containing a repeating unit derived from a (meth)acrylic monomer, an aromatic vinyl monomer, a conjugated diene monomer or the like. Examples of such a block chain include a block chain obtained by homopolymerization, a block chain obtained by random copolymerization and a block chain obtained by alternating copolymerization.

Examples of the (meth)acrylic acid-based monomer, the aromatic vinyl-based monomer and the conjugated diene-based monomer are the same as those described above.

(Ratio Between Block Chains (A) and (B) in Copolymer and their Physical Properties Such as Molecular Weights)

A ratio between the block chain (A) and the block chain (B) in the copolymer of the present invention is not particularly limited, and is 10 to 40:90 to 60 and preferably 15 to 35:85 to 65 in a wt % ratio. Furthermore, a content of the repeating unit having an acidic group in the copolymer is 0.5 to 20 wt % and preferably 1 to 15 wt %.

Also, a weight average molecular weight measured by GPC is 1,000 to 200,000. As a dispersing agent it is preferably 2,000 to 100,000 and more preferably 2,000 to 50,000. A ratio between a weight average molecular weight and a number average molecular weight measured by GPC is 1.0 to 2.5, and preferably 1.0 to 2.0 particularly as a dispersing agent.

(2) Method for Producing Copolymer

A method for producing the block copolymer of the present invention is not particularly limited, and it may be produced by a known method, for example, by polymerizing monomers through living polymerization for obtaining a block copolymer. The living polymerization may be living radical polymerization or living anionic polymerization, between which the living anionic polymerization is preferred.

For obtaining the block copolymer, monomers of the block chain (A) or (B) may be polymerized and the resultant may be successively polymerized with monomers of the other block into a block copolymer, or alternatively, monomers of the block chain (A) and the block chain (B) may be individually reacted to prepare blocks and the blocks may be combined thereafter. The living anionic polymerization is preferably employed because a composition and a molecular weight may be strictly controlled in this method.

In producing a block copolymer by the living anionic polymerization, the polymerization may be performed, for example, by adding a desired monomer dropwise to a solvent including an additive and a polymerization initiator. Here, in order to obtain a block polymer with a desired sequence, a reaction is caused by successively adding monomers of the respective blocks dropwise so as to attain a desired sequence.

In order to polymerize monomers of a given block and subsequently polymerize monomers of a next block, after completing the polymerization reaction of the former block, the monomers of the next block are started to add dropwise. Progress of a polymerization reaction may be checked by detecting a remaining amount of the monomers through gas chromatography or liquid chromatography. Furthermore, after completing the dropwise addition of the monomers of the former block, the resultant may be stirred for 1 minute to 1 hour, depending upon the types of monomers and solvent, before starting the dropwise addition of the monomers of the next block.

When a plurality of kinds of monomers are included in each block, these monomers may be individually or simultaneously added dropwise.

It is generally difficult to polymerize a monomer having a quaternary ammonium base through the living anionic polymerization. Accordingly, in the case where a polymer comprising the repeating unit having a quaternary ammonium base is produced by the living anionic polymerization, a monomer used as a material for a repeating unit having a tertiary amino group is polymerized, and then the tertiary amino group may be quaternized by a known method. Examples of a quaternizing agent include general alkylating agents of alkyl halides such as benzyl chloride, benzyl bromide, benzyl iodide, methyl chloride, ethyl chloride, methyl bromide and methyl iodide, and dimethyl sulfate, diethyl sulfate and di-n-propyl sulfate.

In the case where the living radical polymerization is employed for producing the copolymer, the reaction may be carried out in the same manner as in employing the living anionic polymerization, or after polymerizing monomers of a given block, the resultant polymer is purified once before polymerizing a next monomer, so that the next monomer may be polymerized after removing a residue of the monomer remaining after the former reaction. In the case where it is preferred that the monomers of the respective blocks are not mixed with each other, the polymer is preferably purified.

An anionic polymerization initiator used in the polymerization of monomers is not particularly limited as far as it is a nucleophilic agent having a function to start polymerization of an anionic polymerizable monomer, and for example, an alkali metal or an organic alkali metal compound may be used.

Examples of the alkali metal include lithium, sodium, potassium and cesium. Examples of the organic alkali metal compound include alkylated substances, allylated substances and arylated substances of the aforementioned alkali metals and lithium amide compound. Specifically, ethyllithium, n-butyllithium, sec-butyllithium, t-butyllithium, ethylsodium, lithiumbiphenyl, lithiumnaphthalene, lithiumtriphenyl, sodiumnaphthalene, potassiumnaphthalene, α-methylstyrenesodium dianion, 1,1-diphenylhexyllithium, 1,1-diphenyl-3-methylpentyllithium, 1,4-dilithio-2-butene, 1,6-dilithiohexane, polystyryllithium, cumylpotassium, cumylcesium lithium dimethylamide, lithium diethylamide, lithium dibutylamide, lithium dipropylamide, lithium diisopropylamide, lithium diheptylamide, lithium dihexylamide, lithium dioctylamide or the like may be used. These anionic polymerization initiators may be singly used or a mixture of two or more of them may be used.

A usage of the anionic polymerization initiator is generally 0.0001 to 0.2 equivalent and preferably 0.0005 to 0.1 equivalent based on the entire amount of anionic polymerizable monomers to be used. When an anionic polymerization initiator is used in an amount of this range, a desired polymer may be produced in high yield.

A polymerization temperature employed in the present invention is not particularly limited as far as it falls within a temperature range where a side reaction of a transfer reaction or a termination reaction may be avoided and monomers may be consumed to complete the polymerization, and the polymerization is preferably carried out in a temperature range of −100° C. or higher and a boiling point of a solvent or lower. Furthermore, a concentration of monomers in a polymerization solvent is not particularly limited, and is generally 1 to 40 wt % and preferably 2 to 15 wt %.

The polymerization solvent used in the production method of the present invention is not particularly limited as far as it is not involved in the polymerization reaction and is compatible with polymers, and specific examples include polar solvents of ether-based compounds such as diethyl ether, tetrahydrofuran (THF), dioxane and trioxane, and tertiary amines such as tetramethylethylene diamine and hexamethylphosphoric triamide; and non-polar solvents or low-polar solvents of aliphatic, aromatics or alicyclic hydrocarbon compounds such as hexane and toluene. These solvents may be singly used or a mixture of two or more of them may be used as a mixed solvent. In the production method of the present invention, even when a non-polar solvent or a low-polar solvent is used together with a polar solvent, the polymerization may be accurately controlled, and for example, a non-polar solvent or a low-polar solvent may be used in a ratio of 5 vol % or more, 20 vol % or more, or 50 vol % or more based on the entire amount of the solvent.

In the present invention, dialkyl zinc such as diethyl zinc, dialkyl magnesium such as dibutyl magnesium, or an organic metal such as triethyl aluminum may be used as a polymerization stabilizer or a purifying agent for a monomer or a solvent if necessary.

In the present invention, an additive such as an alkali metal salt or an alkaline earth metal salt may be added at the start of or during the polymerization if necessary. Examples of such an additive include mineral acid salts or halides such as sulfates, nitrates, and borates of sodium, potassium, barium and magnesium, and more specifically, examples are chlorides, bromides and iodides of lithium or barium, lithium borate, magnesium nitrate, sodium chloride and potassium chloride. Among these additives, halides of lithium such as lithium chloride, lithium bromide, lithium iodide and lithium fluoride are preferred, and lithium chloride is particularly preferred.

(3) Use of Copolymer of the Invention

The copolymer of the present invention is useful not only for dispersing various organic pigments in coating, printing ink, inkjet ink, a pigment dispersion used for a color filter and the like but also for dispersing inorganic particles of metal oxide, metal hydroxide, metal carbonate, metal sulfate, metal silicate, metal nitride and the like, and dispersing carbon nanotube. In particular, it is extremely useful for dispersing pigment in a pigment dispersion used for a color filter.

EXAMPLES

The present invention will now be described in detail by way of Examples, which do not limit the technical scope of the invention.

Example 1

A 1000-mL flask was charged with 518.26 g of tetrahydrofuran (hereinafter sometimes abbreviated as THF), 42.09 g of lithium chloride (a THF solution with a concentration of 4.05 wt %) and 2.06 g of diisopropylamine, and the resultant was cooled to −60° C. Thereafter, 8.50 g of n-butyllithium (a hexane solution with a concentration of 15.36 wt %) was added thereto, and the resultant was aged for 15 minutes.

Next, 44.71 g of 2-(dimethylamino)ethyl methacrylate (hereinafter sometimes abbreviated as DMMA) was added dropwise thereto, and the reaction was continued for 20 minutes after the dropwise addition. Then, the resultant was subjected to gas chromatography (hereinafter abbreviated as GC), so as to confirm disappearance of the monomers. A part of the thus obtained reaction solution was sampled to be analyzed by gel permeation chromatography (hereinafter abbreviated as GPC) (mobile phase: THF, PMMA standard), and it was found to have a molecular weight (Mw) of 2860 and a molecular weight distribution (Mw/Mn) of 1.15.

Next, a mixed solution of 28.05 g of methyl methacrylate (hereinafter sometimes abbreviated as MMA), 39.24 g of n-butyl methacrylate (hereinafter sometimes abbreviated as nBMA) and 28.03 g of 3-ethyl-3-oxetanyl methacrylate (hereinafter sometimes abbreviated as OXMA) was added dropwise thereto over 60 minutes, and the reaction was continued for 30 minutes after the dropwise addition. The resultant was subjected to the GC, and after thus confirming disappearance of the monomers, 3.22 g of methanol was added thereto to terminate the reaction.

The thus obtained copolymer was analyzed by the GPC (mobile phase: DMF, PMMA standard), and it was confirmed to be a copolymer having a molecular weight (Mw) of 9410, a molecular weight distribution (Mw/Mn) of 1.17 and a composition ratio of DMMA-[MMA/nBMA/OXMA]=32-[20/28/20] (wt %).

The reaction solution was diluted with ethyl acetate, the resultant was washed with water three times, and the solvent was distilled off. After replacing the solvent by 2-methoxy-1-methylethyl acetate (hereinafter abbreviated as PGMEA), 1-ethoxy-2-propanol (hereinafter abbreviated as PGME) was added thereto, so as to make adjustment to obtain an approximately 35 wt % solution of PGMEA/PGME=7/3 (w/w). To the thus obtained solution, benzyl chloride (hereinafter sometimes abbreviated as BzCl) in an amount of 0.8 equivalent based on DMMA was added, and the reaction was conducted at 70° C. for 7 hours for causing quaternization.

Example 2

A 1000-mL flask was charged with 535.69 g of THF, 44.41 g of lithium chloride (a THF solution with a concentration of 4.05 wt %) and 2.10 g of diisopropylamine, and the resultant was cooled to −60° C. Thereafter, 8.53 g of n-butyllithium (a hexane solution with a concentration of 15.36 wt %) was added thereto, and the resultant was aged for 15 minutes.

Next, 45.57 g of DMMA was added dropwise thereto, and the reaction was continued for 20 minutes after the dropwise addition. Then, the resultant was subjected to the GC, so as to confirm disappearance of the monomers. A part of the thus obtained reaction solution was sampled to be analyzed by the GPC (mobile phase: THF, PMMA standard), and it was found to have a molecular weight (Mw) of 3220 and a molecular weight distribution (Mw/Mn) of 1.15.

Next, a mixed solution of 23.83 g of MMA, 39.32 g of nBMA, 25.24 g of OXMA and 12.74 g of 1-ethoxyethyl methacrylate (hereinafter sometimes abbreviated as EEMA)

was added dropwise thereto over 60 minutes, and the reaction was continued for 30 minutes after the dropwise addition. The resultant was subjected to the GC, and after thus confirming disappearance of the monomers, 3.28 g of methanol was added thereto to terminate the reaction.

The thus obtained copolymer was analyzed by the GPC (mobile phase: THF, PMMA standard), and it was confirmed to be a copolymer having a molecular weight (Mw) of 10720, a molecular weight distribution (Mw/Mn) of 1.11 and a composition ratio of DMMA-[MMA/nBMA/OXMA/EEMA]= 31-[16/27/17/9] (wt %).

The reaction solution was diluted with ethyl acetate, the resultant was washed with water three times, and the solvent was distilled off. After replacing the solvent by PGMEA, water in the same amount as the polymer was added thereto, and the resultant was aged at 115° C. for 7 hours. The thus obtained copolymer was analyzed by the GPC (mobile phase: DMF, PMMA standard), whereby confirming that it was a copolymer having a molecular weight (Mw) of 6510, a molecular weight distribution (Mw/Mn) of 1.46 and a composition ratio of DMMA-[MMA/nBMA/OXMA/MA]=32-[17/28/18/5] (wt %). Here, MA means methacrylic acid, which was obtained by deprotection of EEMA.

Next, PGME was added to the copolymer, so as to make adjustment to obtain an approximately 35 wt % solution of PGMEA/PGME=7/3 (w/w). To the thus obtained solution, BzCl in an amount of 0.8 equivalent based on DMMA was added, and the reaction was conducted at 70° C. for 7 hours for causing quaternization.

Example 3

A 1000-mL flask was charged with 521.71 g of THF, 46.79 g of lithium chloride (a THF solution with a concentration of 4.05 wt %) and 2.14 g of diisopropylamine, and the resultant was cooled to −60° C. Thereafter, 8.20 g of n-butyllithium (a hexane solution with a concentration of 15.36 wt %) was added thereto, and the resultant was aged for 15 minutes.

Next, 44.82 g of DMMA was added dropwise thereto, and the reaction was continued for 20 minutes after the dropwise addition. Then, the resultant was subjected to the GC, so as to confirm disappearance of the monomers. A part of the thus obtained reaction solution was sampled to be analyzed by the GPC (mobile phase: THF, PMMA standard), and it was found to have a molecular weight (Mw) of 3490 and a molecular weight distribution (Mw/Mn) of 1.09.

Next, a mixed solution of 28.50 g of MMA, 39.60 g of nBMA and 28.48 g of allyl methacrylate (hereinafter sometimes abbreviated as AMA) was added dropwise thereto over 60 minutes, and the reaction was continued for 30 minutes after the dropwise addition. The resultant was subjected to the GC, and after thus confirming disappearance of the monomers, 3.38 g of methanol was added thereto to terminate the reaction.

The thus obtained copolymer was analyzed by the GPC (mobile phase: DMF, PMMA standard), and it was confirmed to be a copolymer having a molecular weight (Mw) of 11320, a molecular weight distribution (Mw/Mn) of 1.16 and a composition ratio of DMMA-[MMA/nBMA/AMA]=32-[20/28/20] (wt %).

The reaction solution was diluted with ethyl acetate, the resultant was washed with water three times, and the solvent was distilled off. After replacing the solvent by PGMEA, PGME was added thereto, so as to make adjustment to obtain an approximately 35 wt % solution of PGMEA/PGME=7/3 (w/w). To the thus obtained solution, BzCl in an amount of 0.8 equivalent based on DMMA was added, and the reaction was conducted at 70° C. for 7 hours for causing quaternization.

Example 4

A 1000-mL flask was charged with 519.56 g of THF, 48.46 g of lithium chloride (a THF solution with a concentration of 4.05 wt %) and 2.11 g of diisopropylamine, and the resultant was cooled to −60° C. Thereafter, 8.47 g of n-butyllithium (a hexane solution with a concentration of 15.36 wt %) was added thereto, and the resultant was aged for 15 minutes.

Next, 45.12 g of DMMA was added dropwise thereto, and the reaction was continued for 20 minutes after the dropwise addition. Then, the resultant was subjected to the GC, so as to confirm disappearance of the monomers. A part of the thus obtained reaction solution was sampled to be analyzed by the GPC (mobile phase: THF, PMMA standard), and it was found to have a molecular weight (Mw) of 2800 and a molecular weight distribution (Mw/Mn) of 1.15.

Next, a mixed solution of 23.86 g of MMA, 39.95 g of nBMA, 25.57 g of AMA and 12.78 g of EEMA was added dropwise thereto over 60 minutes, and the reaction was continued for 30 minutes after the dropwise addition. The resultant was subjected to the GC, and after thus confirming disappearance of the monomers, 3.22 g of methanol was added thereto to terminate the reaction.

The thus obtained copolymer was analyzed by the GPC (mobile phase: THF, PMMA standard), and it was confirmed to be a copolymer having a molecular weight (Mw) of 10470, a molecular weight distribution (Mw/Mn) of 1.12 and a composition ratio of DMMA-[MMA/nBMA/AMA/EEMA]=31-[16/27/17/9] (wt %).

The reaction solution was diluted with ethyl acetate, the resultant was washed with water three times, and the solvent was distilled off. After replacing the solvent by PGMEA, water in the same amount as the polymer was added thereto, and the resultant was aged at 115° C. for 7 hours. The thus obtained copolymer was analyzed by the GPC (mobile phase: DMF, PMMA standard, with a column changed), whereby confirming that it was a copolymer having a molecular weight (Mw) of 6340, a molecular weight distribution (Mw/Mn) of 1.50 and a composition ratio of DMMA-[MMA/nBMA/AMA/MA]=32-[17/28/18/5] (wt %). Here, MA means the same as described above.

Next, PGME was added to the copolymer, so as to make adjustment to obtain an approximately 35 wt % solution of PGMEA/PGME=7/3 (w/w). To the thus obtained solution, BzCl in an amount of 0.8 equivalent based on DMMA was added, and the reaction was conducted at 70° C. for 7 hours for causing quaternization.

Example 5

A 1000-mL flask was charged with 521.03 g of THF, 48.20 g of lithium chloride (a THF solution with a concentration of 3.59 wt %) and 2.11 g of diisopropylamine, and the resultant was cooled to −60° C. Thereafter, 8.67 g of n-butyllithium (a hexane solution with a concentration of 15.36 wt %) was added thereto, and the resultant was aged for 15 minutes.

Next, 44.75 g of DMMA was added dropwise thereto, and the reaction was continued for 20 minutes after the dropwise addition. Then, the resultant was subjected to the GC, so as to confirm disappearance of the monomers. A part of the thus obtained reaction solution was sampled to be analyzed by the GPC (mobile phase: THF, PMMA standard), and it was found to have a molecular weight (Mw) of 3060 and a molecular weight distribution (Mw/Mn) of 1.09.

Next, a mixed solution of 27.80 g of MMA, 39.31 g of nBMA and 28.15 g of tetrahydrofurfuryl methacrylate (hereinafter sometimes abbreviated as THFMA) was added dropwise thereto over 60 minutes, and the reaction was continued for 30 minutes after the dropwise addition. The resultant was subjected to the GC, and after thus confirming disappearance of the monomers, 3.29 g of methanol was added thereto to terminate the reaction.

The thus obtained copolymer was analyzed by the GPC (mobile phase: DMF, PMMA standard), and it was confirmed to be a copolymer having a molecular weight (Mw) of 9020, a molecular weight distribution (Mw/Mn) of 1.12 and a composition ratio of DMMA-[MMA/nBMA/THFMA]=32-[20/28/20] (wt %).

The reaction solution was diluted with ethyl acetate, the resultant was washed with water three times, and the solvent was distilled off. After replacing the solvent by PGMEA, PGME was added thereto, so as to make adjustment to obtain an approximately 35 wt % solution of PGMEA/PGME=7/3 (w/w). To the thus obtained solution, BzCl in an amount of 0.8 equivalent based on DMMA was added, and the reaction was conducted at 70° C. for 7 hours for causing quaternization.

Comparative Example 1

A 1000-mL flask was charged with 560.41 g of THF, 11.32 g of lithium chloride (a THF solution with a concentration of 3.63 wt %) and 3.27 g of diphenylethylene, and the resultant was cooled to −60° C. Thereafter, 7.28 g of n-butyllithium (a hexane solution with a concentration of 15.36 wt %) was added thereto, and the resultant was aged for 15 minutes.

Next, a mixed solution of 33.69 g of MMA, 15.80 g of nBMA, 8.66 g of methoxy polyethylene glycol monomethacrylate (PME-200, manufactured by NOF Corporation) (hereinafter sometimes abbreviated as PEGMA) and 23.15 g of AMA was added dropwise thereto over 60 minutes, and the reaction was continued for 20 minutes after the dropwise addition. Then, the resultant was subjected to the GC, so as to confirm disappearance of the monomers. A part of the thus obtained reaction solution was sampled to be analyzed by the GPC (mobile phase: DMF, PMMA standard), and it was found to have a molecular weight (Mw) of 7300 and a molecular weight distribution (Mw/Mn) of 1.08.

Next, 40.30 g of DMMA was added dropwise thereto, and the reaction was continued for 30 minutes after the dropwise addition. The resultant was subjected to the GC, and after thus confirming disappearance of the monomers, 3.65 g of methanol was added thereto to terminate the reaction.

The thus obtained copolymer was analyzed by the GPC (mobile phase: DMF, PMMA standard), and it was confirmed to be a copolymer having a molecular weight (Mw) of 9430, a molecular weight distribution (Mw/Mn) of 1.10 and a composition ratio of DMMA-[MMA/nBMA/PEGMA/AMA]=33-[28/13/7/19] (wt %).

The reaction solution was diluted with ethyl acetate, the resultant was washed with water three times, and the solvent was distilled off. After replacing the solvent by PGMEA, PGME was added thereto, so as to make adjustment to obtain an approximately 35 wt % solution of PGMEA/PGME=7/3 (w/w). To the thus obtained solution, BzCl in an amount of 0.8 equivalent based on DMMA was added, and the reaction was conducted at 70° C. for 7 hours for causing quaternization.

Comparative Example 2

A 1000-mL flask was charged with 617.82 g of THF, 12.44 g of lithium chloride (a THF solution with a concentration of 3.63 wt %) and 3.39 g of diphenylethylene, and the resultant was cooled to −60° C. Thereafter, 7.82 g of n-butyllithium (a hexane solution with a concentration of 15.36 wt %) was added thereto, and the resultant was aged for 15 minutes.

Next, a mixed solution of 40.24 g of MMA, 18.70 g of nBMA, 10.17 g of PEGMA and 27.30 g of OXMA was added dropwise thereto over 60 minutes, and the reaction was continued for 20 minutes after the dropwise addition. Then, the resultant was subjected to the GC, so as to confirm disappearance of the monomers. A part of the thus obtained reaction solution was sampled to be analyzed by the GPC (mobile phase: DMF, PMMA standard), and it was found to have a molecular weight (Mw) of 5870 and a molecular weight distribution (Mw/Mn) of 1.06.

Next, 47.38 g of DMMA was added dropwise thereto, and the reaction was continued for 30 minutes after the dropwise addition. The resultant was subjected to the GC, and after thus confirming disappearance of the monomers, 3.86 g of methanol was added thereto to terminate the reaction.

The thus obtained copolymer was analyzed by the GPC (mobile phase: DMF, PMMA standard), and it was confirmed to be a copolymer having a molecular weight (Mw) of 7640, a molecular weight distribution (Mw/Mn) of 1.07 and a composition ratio of DMMA-[MMA/nBMA/PEGMA/OXMA]=33-[28/13/7/19] (wt %).

The reaction solution was diluted with ethyl acetate, the resultant was washed with water three times, and the solvent was distilled off. After replacing the solvent by PGMEA, PGME was added thereto, so as to make adjustment to obtain an approximately 35 wt % solution of PGMEA/PGME=7/3 (w/w). To the thus obtained solution, BzCl in an amount of 0.8 equivalent based on DMMA was added, and the reaction was conducted at 70° C. for 7 hours for causing quaternization.

Comparative Example 3

A 1000-mL flask was charged with 626.56 g of THF, 10.26 g of lithium chloride (a THF solution with a concentration of 3.63 wt %) and 3.23 g of diphenylethylene, and the resultant was cooled to −60° C. Thereafter, 6.95 g of n-butyllithium (a hexane solution with a concentration of 15.36 wt %) was added thereto, and the resultant was aged for 10 minutes.

Next, a mixed solution of 26.52 g of MMA and 62.13 g of nBMA was added dropwise thereto over 30 minutes, and the reaction was continued for 15 minutes after the dropwise addition. Then, the resultant was subjected to the GC, so as to confirm disappearance of the monomers. A part of the thus obtained reaction solution was sampled to be analyzed by the GPC (mobile phase; DMF, PMMA standard), and it was found to have a molecular weight (Mw) of 3840 and a molecular weight distribution (Mw/Mn) of 1.04.

Next, 42.19 g of DMMA was added dropwise thereto, and the reaction was continued for 30 minutes after the dropwise addition. The resultant was subjected to the GC, and after thus confirming disappearance of the monomers, 3.79 g of methanol was added thereto to terminate the reaction.

The thus obtained copolymer was analyzed by the GPC (mobile phase: DMF, PMMA standard), and it was confirmed to be a copolymer having a molecular weight (Mw) of 5770, a molecular weight distribution (Mw/Mn) of 1.08 and a composition ratio of DMMA-[MMA/nBMA]=32-[20/48] (wt %).

The reaction solution was diluted with ethyl acetate, the resultant was washed with water three times, and the solvent was distilled off. After replacing the solvent by PGMEA, PGME was added thereto, so as to make adjustment to obtain an approximately 35 wt % solution of PGMEA/PGME=7/3 (w/w). To the thus obtained solution, BzCl in an amount of 0.8 equivalent based on DMMA was added, and the reaction was conducted at 70° C. for 7 hours for causing quaternization.

(Preparation of the Pigment Dispersing Agents)

The copolymer solutions obtained in Examples 1 to 5 and Comparative Examples 1 to 3 were each used as pigment dispersing agents for preparing pigment dispersions as follows.

A pigment dispersion was prepared by mixing and dispersing, for 12 hours with a bead mill, 15 parts by mass of C. I. Pigment Red 177 used as pigments, 11.5 parts by mass of the solution of any one of the copolymers obtained in Examples 1 to 5 and Comparative Examples 1 to 3 used as the pigment dispersing agent, 55 parts by mass of propylene glycol monomethyl ether acetate and 18.5 parts by mass of diethylene glycol methylethyl ether used as solvents.

As a result, the pigment dispersions prepared by using the solution of the copolymers obtained in Examples 1 to 5 showed a color of brilliant red, and even after they were kept at 40° C. for 1 week, they exhibited viscosity values equivalent to those attained immediately after the preparation. On the other hand, although the pigment dispersion prepared by using the copolymer obtained in Comparative Examples 1 to 3 showed a color of brilliant red, after it was kept at 40° C. for 1 week, its viscosity value was increased by 30% as compared with that attained immediately after the preparation.

INDUSTRIAL APPLICABILITY

The copolymer of the present invention is good in pigment dispersibility, and may be used as, for example, a pigment dispersing agent for a color filter used for manufacturing an optical color filter.

The invention claimed is:

1. A copolymer consisting of:
   a block chain (A) consisting of at least one repeating unit selected from the group consisting of a repeating unit having a tertiary amino group and a repeating unit having a quaternary ammonium base; and
   a block chain (R) consisting of a random copolymer comprising a repeating unit represented by formula (I):

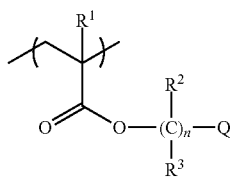
(I)

wherein;
   $R^1$ represents a hydrogen atom or a C1-C3 alkyl group,
   $R^2$ and $R^3$ each independently represent a hydrogen atom or a C1-C6 alkyl group,
   Q represents:
      an oxygen-containing saturated heterocyclic group selected from the group consisting of:
         an oxetanyl group,
         a tetrahydrofuranyl group,
         a tetrahydrofuranyl group, and
         a morpholinyl group,
   the oxygen-containing saturated heterocyclic optionally having an alkyl group as a substituent, and
   n represents an integer of 0 to 6; and
   a repeating unit represented by formula (II):

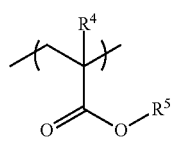
(II)

wherein $R^4$ represents a hydrogen atom or a C1-C3 alkyl group and $R^5$ represents a saturated aliphatic hydrocarbon group or a saturated alicyclic hydrocarbon group, wherein a copolymerization ratio of the repeating unit represented by formula (II) is 90 wt % or more in the block chain (B) excluding the repeating unit represented by formula (I).

2. The copolymer according to claim 1, wherein the at least one repeating unit selected from the group consisting of a repeating unit having a tertiary amino group and a repeating unit having a quaternary ammonium base is a repeating unit represented by formula (III):

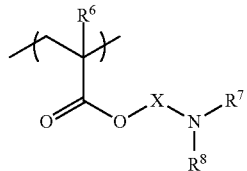
(III)

wherein:
   $R^6$ represents a hydrogen atom or a C1-C3 alkyl group,
   $R^7$ and $R^8$ each independently represent a C1-C6 alkyl group or a C6-C10 aryl C1-C6 alkyl group, and
   X represents a C1-C 10 alkylene group or a C1-C10 alkylene-O-C1-C10 alkylene group.

3. The copolymer according to claim 1, wherein the copolymer has ratio (Mw/Mn) of a weight average molecular weight (Mw) to a number average molecular weight (Mn) of 1.01 to 2.00.

4. The copolymer according to claim 1, wherein the copolymer has a weight average molecular weight (Mw) of 2000 to 50000.

5. The copolymer according to claim 1, wherein a monomer for the repeating unit represented by formula (I) is at least one selected from the group consisting of:
   axetan-2-ylmethyl (meth)acrylate,
   oxetan - 3ylmethyl (meth)acrylate,
   (2-methyloxetan-2-yl)methyl (meth)acrylate,
   (3-methyloxetan-3-yl)methyl (meth)acrylate,
   (2-ethyloxetan-2-yl)methyl (meth)acrylate,
   (3-ethyloxetan-3-yl)methyl (meth)acrylate,
   (3-propyoxetan-3-yl)methyl (meth)acrylate,
   2-(oxetan-2-yl)ethyl (meth)acrylate,
   2-(oxetan-3-yl)ethyl (meth)acrylate,
   (tetrahydrofuran-2-yl)methyl (meth)acrylate,
   (tetrahydrofuran-3-yl)methyl (meth)acrylate,
   (2-methyltetrahydrofuran-2-yl)methyl (meth)acrylate,
   (3-methyltetrahydroforan-3-yl)methyl (meth)acrylate,
   (5-methyltetrahydroforan-2-yl)methyl (meth)acrylate,
   (4-methyltetrahydrofuran-2-yl)methyl (meth)acrylate,
   (3-methyltetrahydrofuran-2-yl)methyl (meth)acry late,
   (2-methyltetrahydrofuran-3-yl)methyl (meth)aerylate,
   (5-methyltetrahydrofuran-3-yl)methyl (meth)acrylate,
   (4-methyltetrahydrofuran-3-yl)methyl (meth)acrylate, and
   2-(tetrahydrofuran-3-yl)ethyl (meth)acrylate.

* * * * *

UNITED STATES PATENT AND TRADEMARK OFFICE
CERTIFICATE OF CORRECTION

PATENT NO. : 9,018,311 B2
APPLICATION NO. : 13/879159
DATED : April 28, 2015
INVENTOR(S) : Niitani et al.

Page 1 of 1

It is certified that error appears in the above-identified patent and that said Letters Patent is hereby corrected as shown below:

In the Claims

Claim 1
    Column 17, Line 23, change "a block chain (R) consisting" to --a block chain (B) consisting--
    Column 17, Line 34, change "wherein;" to --wherein:--
    Column 17, Line 35, change "C1-C3alkyl group" to --C1-C3 alkyl group--
    Column 17, Line 37, change "C1-C6alkyl group" to --C1-C6 alkyl group--
    Column 17, Line 42, change "tetrahydrofuranyl" to --tetrahydropyranyl--
    Column 17, Line 44, change "saturated heterocyclic optionally" to --saturated heterocyclic group optionally--
    Column 17, Line 55, change "C1-C3alkyl group" to --C1-C3 alkyl group--

Claim 2
    Column 18, Line 25, change "C1-C 10 alkylene" to --C1-C10 alkylene--

Claim 5
    Column 18, Line 37, change "axetan-2-ylmethyl" to --oxetan-2-ylmethyl--
    Column 18, Line 38, change "oxetan - 3ylmethyl" to --oxetan-3-ylmethyl--
    Column 18, Line 42, change "(3-propyoxetan-3-yl)" to --(3-propyloxetan-3-yl)--
    Column 18, Line 48, change "(3-methyltetrahydroforan-3-yl)" to --(3-methyltetrahydrofuran-3-yl)--
    Column 18, Line 49, change "(5-methyltetrahydroforan-2-yl)" to --(5-methyltetrahydrofuran-2-yl)--
    Column 18, Line 51, change "(meth)acry late" to --(meth)acrylate--
    Column 18, Line 52, change "(meth)aerylate" to --(meth)acrylate--
    Column 18, Line 54, change "(4-methyltetrahydrofuran-3-yl)methyl   (meth)acrylate" to --(4-methyltetrahydrofuran-3-yl)methyl (meth)acrylate--

Signed and Sealed this
Fifteenth Day of September, 2015

Michelle K. Lee
*Director of the United States Patent and Trademark Office*